United States Patent [19]

Piccioli et al.

[11] Patent Number: 4,549,066

[45] Date of Patent: Oct. 22, 1985

[54] TRIMMING OF POLYESTER CONTAINERS USING A LASER

[75] Inventors: David P. Piccioli, Milford; Ieuan L. Harry, Nashua; Richard E. Clark, Merrimack, all of N.H.

[73] Assignee: Continental Packaging Company, Inc., Stamford, Conn.

[21] Appl. No.: 583,543

[22] Filed: Feb. 24, 1984

[51] Int. Cl.[4] .............................................. B23K 26/00
[52] U.S. Cl. ...................... 219/121 LG; 219/121 LN; 219/121 FS; 264/22; 264/536; 425/527; 425/806
[58] Field of Search ................. 219/121 LG, 121 LN, 219/121 LU, 121 LV, 121 LP, 121 LE, 121 LF, 121 FS; 156/DIG. 80; 264/1.4, 22, 25, 536; 425/806, 527

[56] References Cited

U.S. PATENT DOCUMENTS

| | | |
|---|---|---|
| 3,469,076 | 9/1969 | Saslawsky ............................ 219/383 |
| 3,629,546 | 12/1971 | Fry ................................... 219/121 L |
| 3,819,317 | 6/1974 | Higginbotham ................ 425/806 X |
| 3,960,624 | 6/1976 | Erlandson ............... 219/121 LG X |
| 3,981,230 | 9/1976 | Lee ................................. 219/121 LM |
| 4,174,476 | 11/1979 | Boling et al. ...................... 219/121 L |
| 4,315,133 | 2/1982 | Morgan et al. ................ 219/121 FS |
| 4,319,120 | 3/1982 | LaRocca ....................... 219/121 FS |
| 4,465,919 | 8/1984 | Röder ...................... 219/121 LY X |

*Primary Examiner*—C. L. Albritton
*Attorney, Agent, or Firm*—Charles E. Brown

[57] ABSTRACT

This relates to the cutting or trimming of a blow molded polyester resin article utilizing a $CO_2$ laser. The article is axially positioned and rotated while the laser beam is focused and concentrated on a preselected portion of the article. The laser beam beneficially vaporizes the polyester resin in the cutting thereof as opposed to forming a dust. Further, the action of the laser is one wherein a certain melting occurs so that the resultant cut edge of the retained part of the article is rounded and sealed.

8 Claims, 4 Drawing Figures

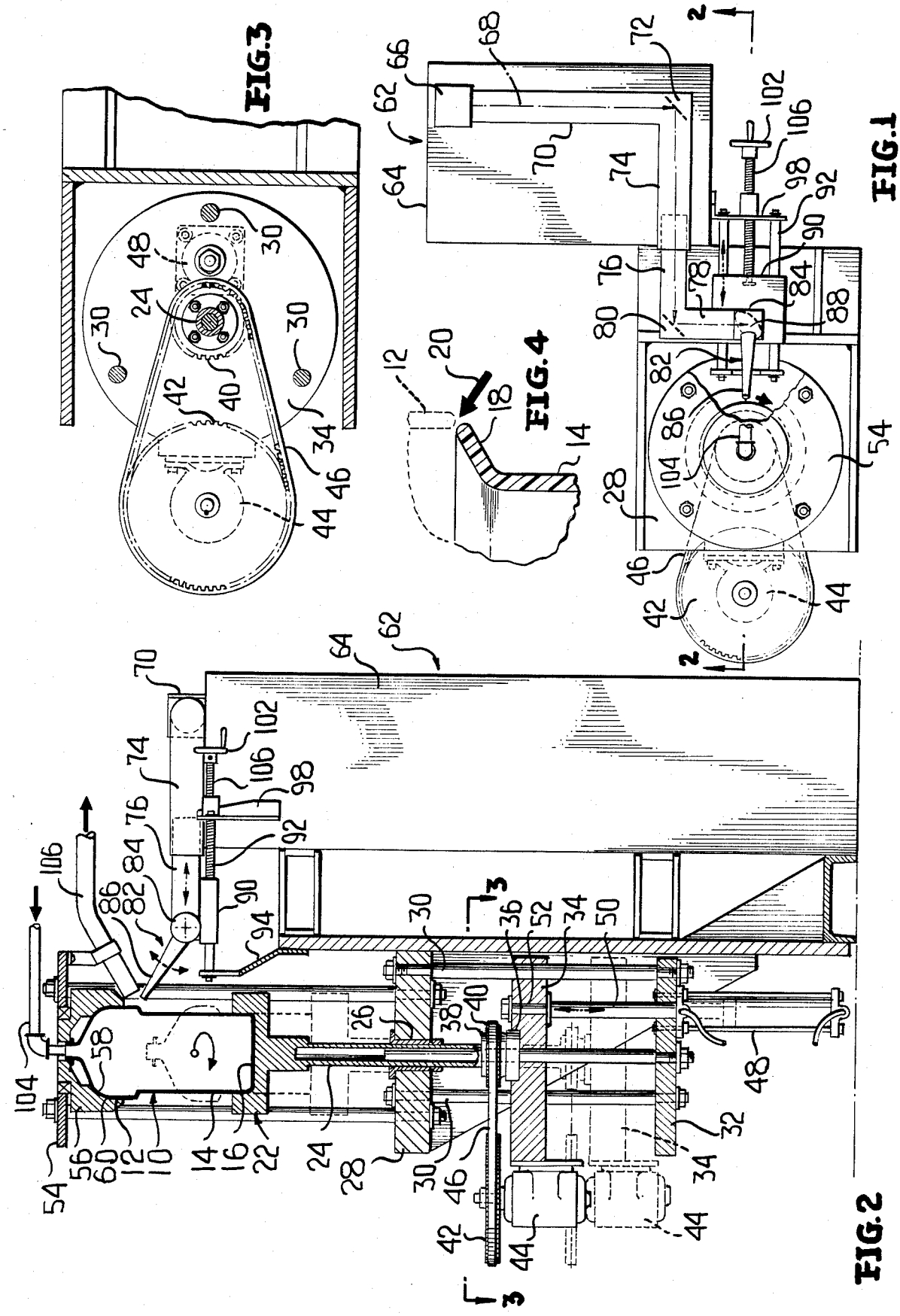

TRIMMING OF POLYESTER CONTAINERS USING A LASER

There has been developed a method of forming containers of a thermoplastic resin such as PET wherein an intermediate article of manufacture is blow molded and then that article is divided into at least two parts by cutting the same.

Attempts have been made to effect the cutting using a knife or other sharp blade-like member and rotating the blown article while holding the knife stationary or by holding the blown article stationary and rotating the knife. The end result has been the same, a raw edge which is undesirable. First of all, the utilization of a knife results in an internal delamination of the blow molded polyester resin. Secondly, even when the knife is very sharp, the resultant cut edge is relatively rough.

In accordance with this invention, it has been found hat the necessary severing of a blow molded polyester resin such as PET article into parts may be readily effected utilizing a laser.

The advantages of using a laser include the following:

1. The laser beam as it cuts through the polyester also fuses the surface which prevents delamination from occuring. Delamination can occur to a knife trim causing closing problems.

2. The laser does not have to contact the polyester container.

3. The laser creates a vapor not a dust which can be vacumed away during the cutting process.

4. The quality and shape of the cut make it suitable for double seaming.

5. The quality and shape of the cut make it suitable for sealing with lined lids.

6. The polyester will dull the edge of hardened steel at high rates making tooling replacement costly and time consuming.

7. The gas jet nozzle can be varied to change the cut form from straight to some angle.

8. The method developed for holding the container ensures that the container is round during cutting.

9. Bubble location on the container contains trimming location feature.

10. The container is put under pressure during cutting to prevent vaporized material from depositing inside the container, i.e. as the container is cut through the inside air pressure is released through the cut, hence creating an air flow from inside to outside.

11. Laser cutting does not generate enough heat in adjacent material to effect the biaxial orientation of material near the cut.

With the above and other objects in view that will hereinafter appear, the nature of the invention will be more cleaely understood by reference to the following detailed description, the appended claims, and the several views illustrated in the accompanying drawings.

IN THE DRAWINGS

FIG. 1 is a plan view with parts broken away of an apparatus embodying the invention.

FIG. 2 is a vertical sectional view taken generally along the line 2—2 of FIG. 1, and shows the specific details of the means for supporting and rotating a blow molded article and the positioning of a laser head relative thereto.

FIG. 3 is a fragmentary horizontal sectional view taken generally along the line 3—3 of FIG. 2, and shows the general details of the drive for rotating the blow molded article to be cut.

FIG. 4 is a schematic sectional view showing diagrammatically how the blow molded article is cut and the details of the resultant cut edge.

Prior to this invention there was developed a blow molded intermediate article of manufacture wherein an upper portion of the article is to be trimmed or cut from the lower portion, leaving a container having a peripheral seaming flange for having secured thereto by a conventional double seaming operation a conventional metal end. The blow molded intermediate article of manufacture is illustrated in FIG. 2 and is generally identified by the numeral 10. The upper portion of the intermediate article 10, generally identified by the numeral 12, is to be removed, leaving a bottom portion 14 in the form of a container having a bottom 16 and an open mouth defined by a seaming flange 18 (FIG. 4).

In accordance with this invention, the blow molded article 10 is to be rotated about its axis at a fixed portion along the axis, and the article is to be divided into the parts 12 and 14 using a laser beam which is diagrammatically illustrated in FIG. 4 and identified by the numeral 20.

In the simplest form of the invention, there is provided a support 22 for receiving a base portion of the blow molded article 10. The support 22 is carried by a shaft 24 which is mounted for rotation and axial movement. The shaft 24 is rotatably journalled in a bearing 26 carried by a mounting plate 28, and depending from the mounting plate 28 is a plurality of guide rods 30 which have their lower ends fixed to a further support plate 32. The guide rods 30 have mounted thereon for movement axially of the article 10 a plate 34 which has connected thereto by means of a rotary coupler 36 a drive unit 38 which is secured to the shaft 24 for rotation therewith. The drive unit 38 includes a sprocket or pulley 40 which is coupled to a similar sprocket or pulley 42 carried by a motor 44, the coupling being by means of a drive belt or chain 46.

At this time it is to be noted that the motor 44 is fixedly secured to the plate 34 for movement therewith. The coupler 36 also couples the shaft 24 to the plate 34 for movement therewith.

The plate 32 carries an extensible fluid motor 48 which includes an extensible shaft 50 having an upper portion 52 which is fixedly secured to the plate 34. In this manner the plate 34 may be moved along the axis identified by the guide rods 30 moving the support 22 in an axial direction while it is being rotated by the motor 44.

The mechanism also includes a top plate 54 which has rotatably journalled therein an upper support 56 for the upper part of the blow molded article 10.

It is to be understood that the support 56 is internally configurated so as to define a shoulder 58 which will engage a shoulder 60 of a bubble portion of the upper part 12 of the article 10 so as accurately to position the article 10 along the axis defined by the rods 30.

The mechanism also includes a conventional type of laser beam generator 62 which is mounted within a cabinet 64. If desired, the plates 28 and 32 may be fixedly secured to the cabinet 64 by way of suitable brackets.

Referring now to FIG. 1 in particular, it will be seen that the laser unit 62 includes a beam generating head 66 which is mounted on top of the cabinet 64. A laser beam 68 is directed from the head 66 through a suitable protective tube 70 to a reflective prism 72 which changes the direction of the beam so that the beam 68 is directed generally toward the above-described mechanism. The deflected beam passes through another protective housing 74 which is in telescoped relation relative to a similar protective housing 76. A further protective housing 78 is disposed at right angles to the housing 76 and there is in a corner between the housings 76, 78 another beam deflecting prism 80 which deflects the beam parallel to its original path.

The laser system also includes a beam directing head 82 which is provided with a housing portion 84 which is rotatably journalled on the housing 78. The housing portion 84 carries a nozzle-like head element 86 and is rotatable about the axis of the laser beam 68 as it passes through the housing 78. The housing portion 84 will carry still another beam deflecting prism 88 for directing the laser beam through the head element 86. It is to be understood that the head element 86 will have therein at least one focusing lens wherein the laser beam 68 will be focused at a predetermined distance from the head 86.

Referring now to FIG. 2, it will be seen that the housing 78 is mounted on a support 90 which is, in turn, mounted for movement toward and away from the axis of the article 10 along horizontal guide rods 92. The rods 92 are suitably supported from the housing 64 by way of front supports 94 and rear supports 98. The rear supports 98 carry a screw threaded feed mechanism 100 having an actuating wheel 102 and coubled to the support 90 for moving the head 86 toward and away from the axis of the article 10 to be cut. It is to be understood that the telescoped slip connection between the housings 74 and 76 permits this movement.

As will be readily apparent from FIG. 2, the head 86 may be pivotally adjusted so that it will direct the emitted laser beam 20 toward the desired portion of the article 10 where severing is to occur. Further, because of the adjustable mounting of the head 86, the focal point of the laser beam 20 may be adjusted to be located at the point where the article 10 is to be severed.

At this time it is pointed out that the pivotal mounting of the head 86 and the adjustable mounting thereof permit articles of different heights and different diameters to be severed.

Because the laser effects a cutting by creating vapor from the polyester resin material as opposed to dust, this vapor can be readily vacuumed away during the cutting process. In order to make certain that the vapor remains externally of the article 10, a suitable air pipe 104 may be provided for directing air under pressure into the blow molded article 10. This air serves a dual purpose in that it expands the article 10 to the desired configuration and holds it firm as the cutting is effected. It also forces the vapor created by the cutting act of the laser beam to remain outside of the article 10. There is also provided a vacuum line 106 which is placed closely adjacent the tip of the head 86 for drawing in the surrounding air and vapor.

With reference to FIG. 4, it is to be noted that since the cutting action of the laser beam 20 is one of melting and vaporizing of the polyester resin in addition to preventing delamination of the resultant raw edge of the article, the resultant raw edge is rounded and sealed.

The laser system is preferably a $CO_2$ laser and is purchased on the open market.

Although only a preferred embodiment of the mechanism has been specifically illustrated and described herein, it is to be understood that minor variations may be made in the manner in which the article to be severed or cut is mounted and rotated without departing from the spirit and scope of the invention as defined by the appended claims.

We claim:

1. A cut-off apparatus for trimming a hollow plastic article, said cut-off apparatus comprising holder means for supporting and rotating a plastic article about a selected axis at a selected position along said axis, and laser means for directing a laser beam toward a selected portion of a hollow plastic article carried by said holder means during the rotation of said hollow plastic article to simultaneously cut said hollow plastic article and to form a resultant cut edge of said hollow plastic article, and means for introducing a gas under pressure into said hollow article during the use of the laser beam to cut the hollow plastic article to direct fusion matter resulting from laser cutting to the exterior of the article being cut.

2. A cut-off apparatus according to claim 1 together with suction exhaust means having an inlet adjacent the exterior of the article being cut for receiving the fusion matter.

3. A cut-off apparatus for trimming a hollow plastic article, said cut-off apparatus comprising holder means for supporting and rotating a plastic article about a selected axis at a selected position along said axis, and laser means for directing a laser beam toward a selected portion of a hollow plastic article carried by said holder means during the rotation of said hollow plastic article to simultaneously cut said hollow plastic article and to form a resultant cut edge of said hollow plastic article, a drive unit connected to said holder means for effecting rotation of said holder means, a common support for said holder means and said drive unit, and means for moving said support along said axis.

4. A method of cutting off a hollow plastic article, said method comprising the steps of mounting a hollow plastic article for rotation about a preselected axis, providing a laser beam, focusing the laser beam to be focused on the hollow plastic article and while supporting the hollow plastic article above and below the focused position of the laser beam rotating the hollow plastic article and emitting laser beam to simultaneously cut off the hollow plastic article and to melt shape the cut edge of the hollow plastic article.

5. A method according to claim 4 wherein the hollow plastic article is internally pressurized to both maintain the shape of the hollow plastic article and present residue resulting from the laser cutting action from entering into the hollow plastic article.

6. A method according to claim 5 wherein a vacuum is applied externally of the hollow plastic article adjacent the location of the cutting.

7. A method according to claim 4 wherein the plastic material of the hollow plastic article being cut is vaporized thereby preventing delimination and the melt shaping of the cut edge results in sealing of the cut edge.

8. A method according to claim 7 wherein the melt shaping of the cut edge results in the formation of a rounded edge.

* * * * *